Patented Sept. 14, 1954

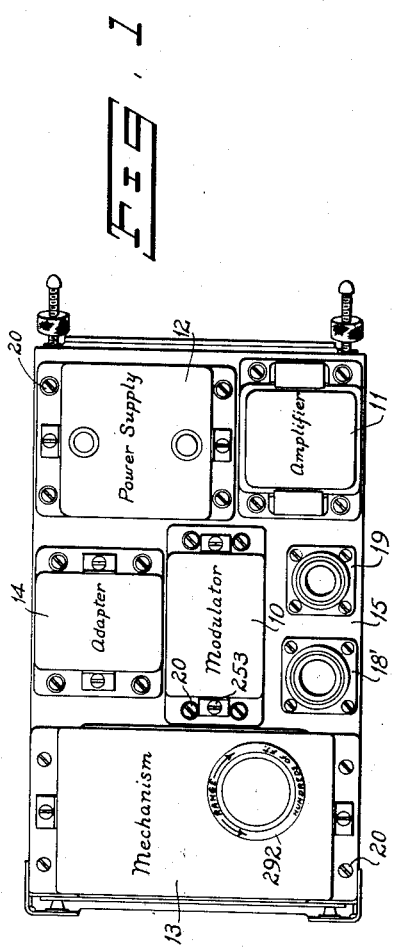
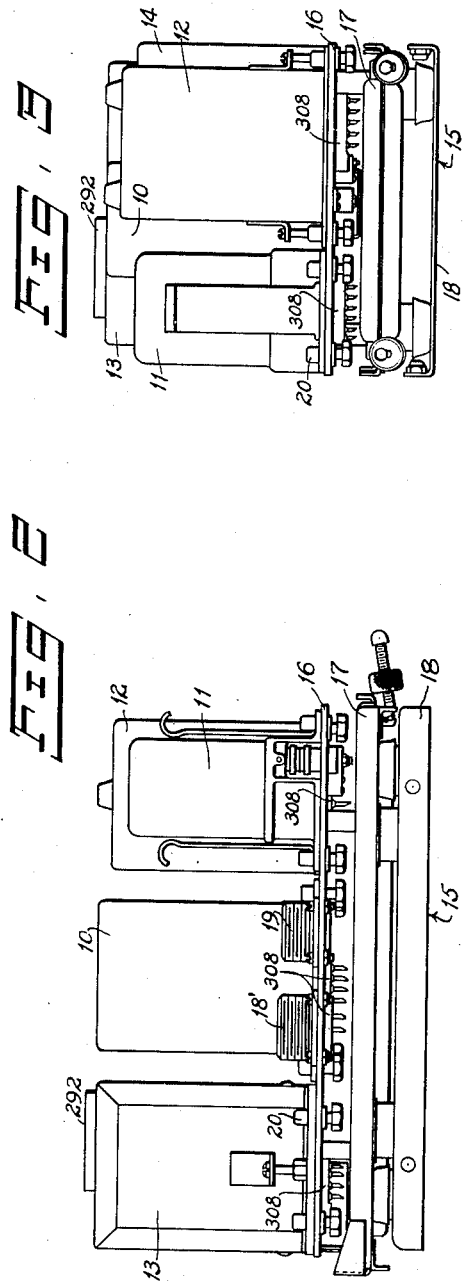

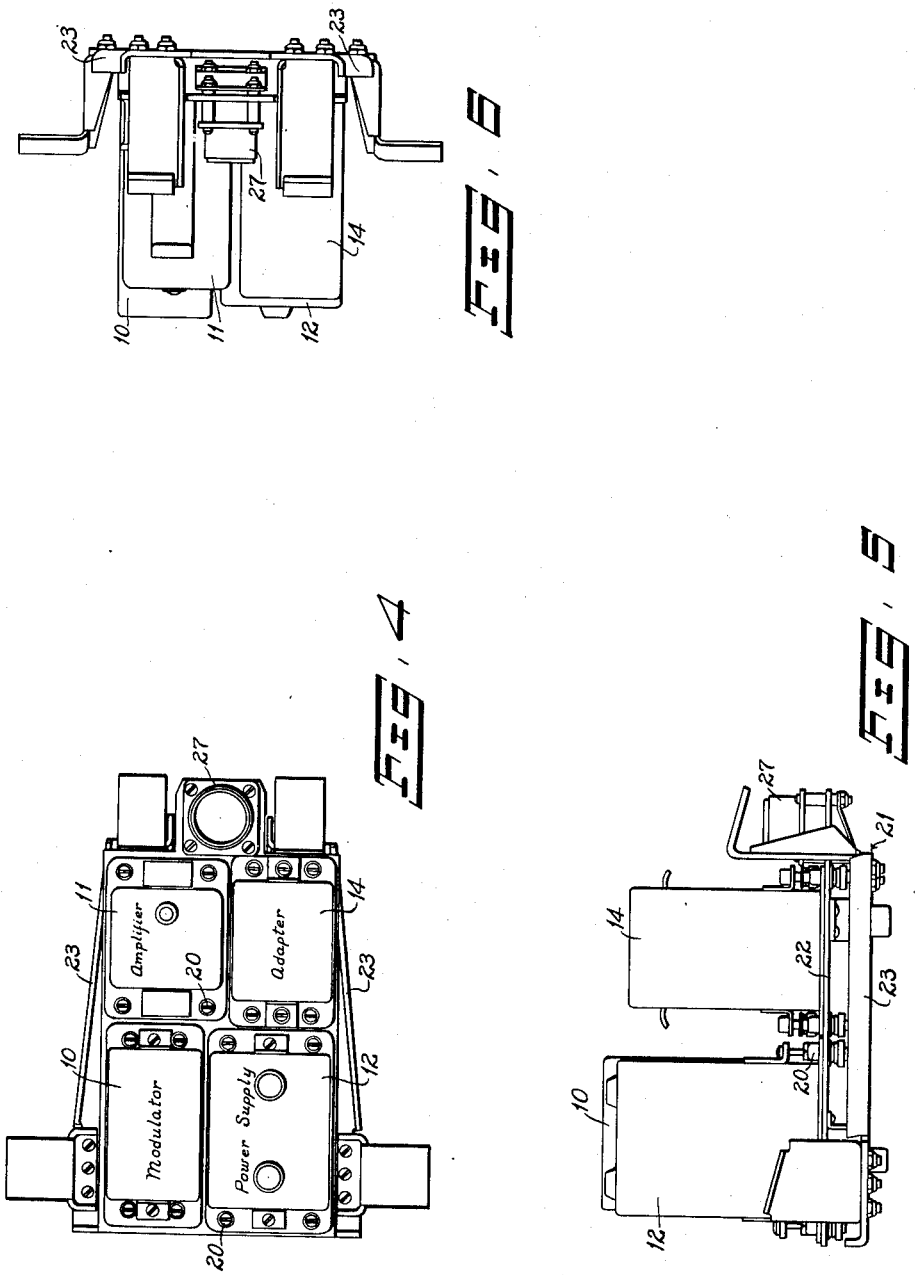

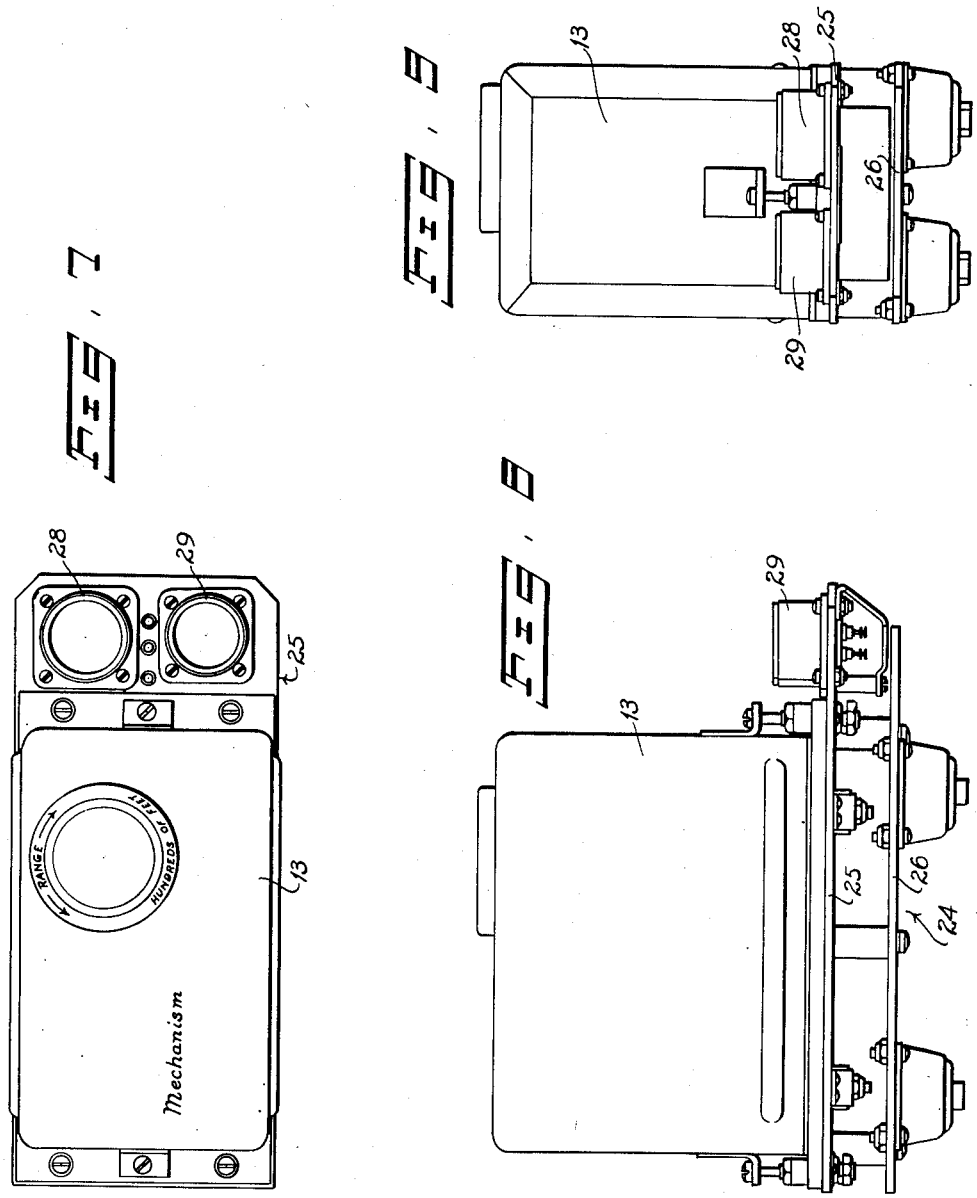

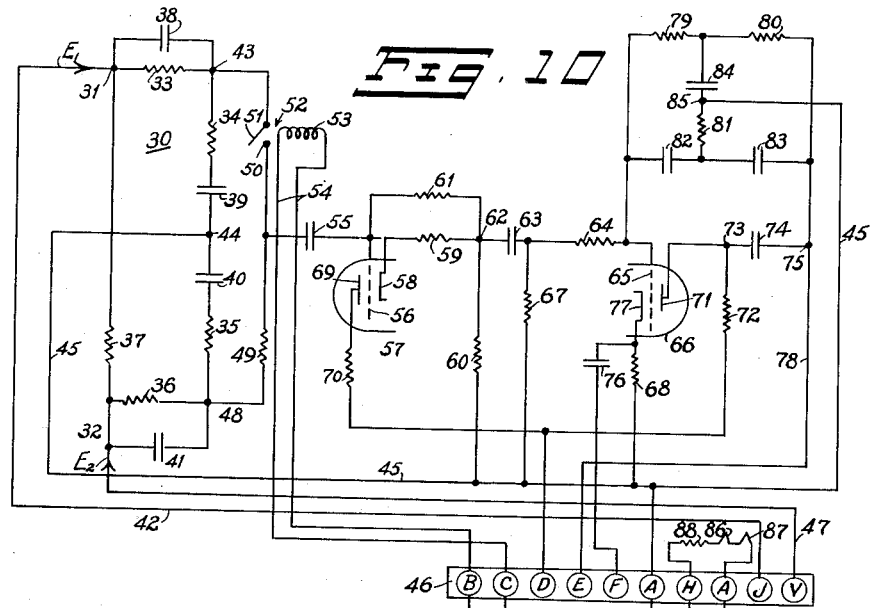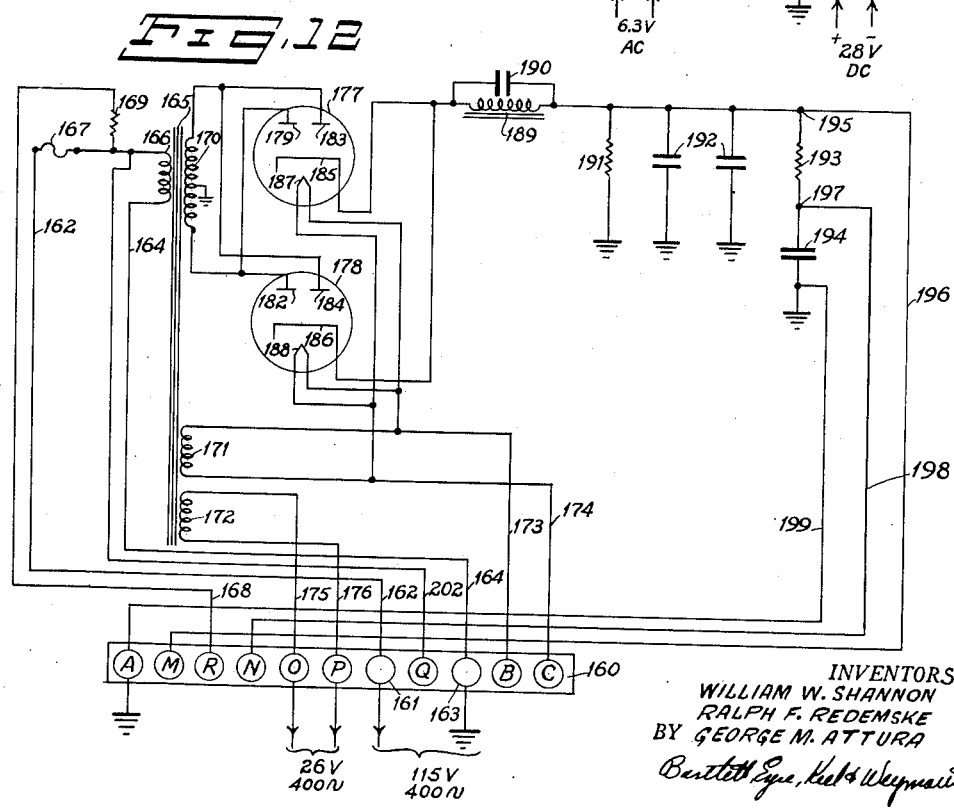

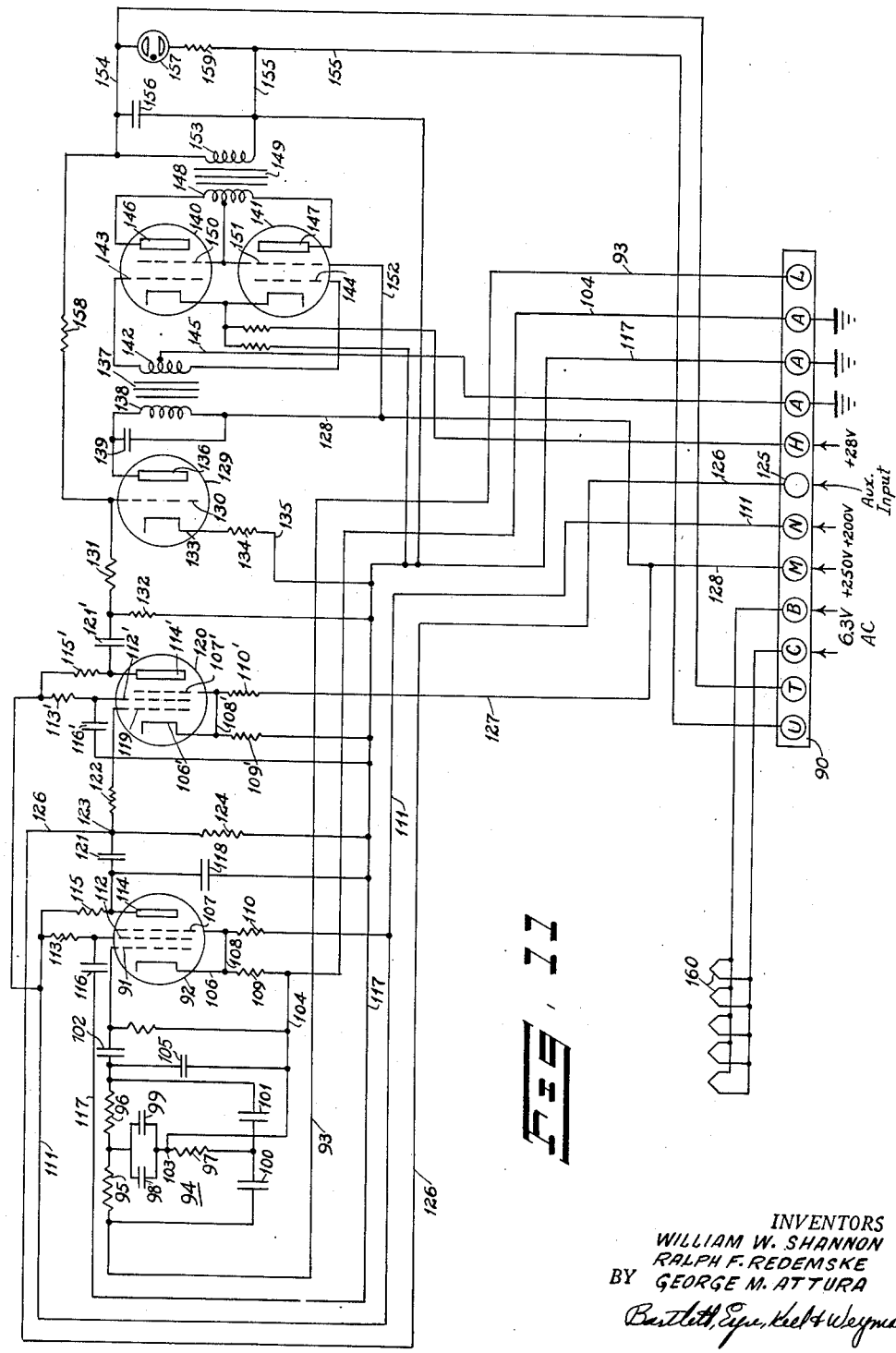

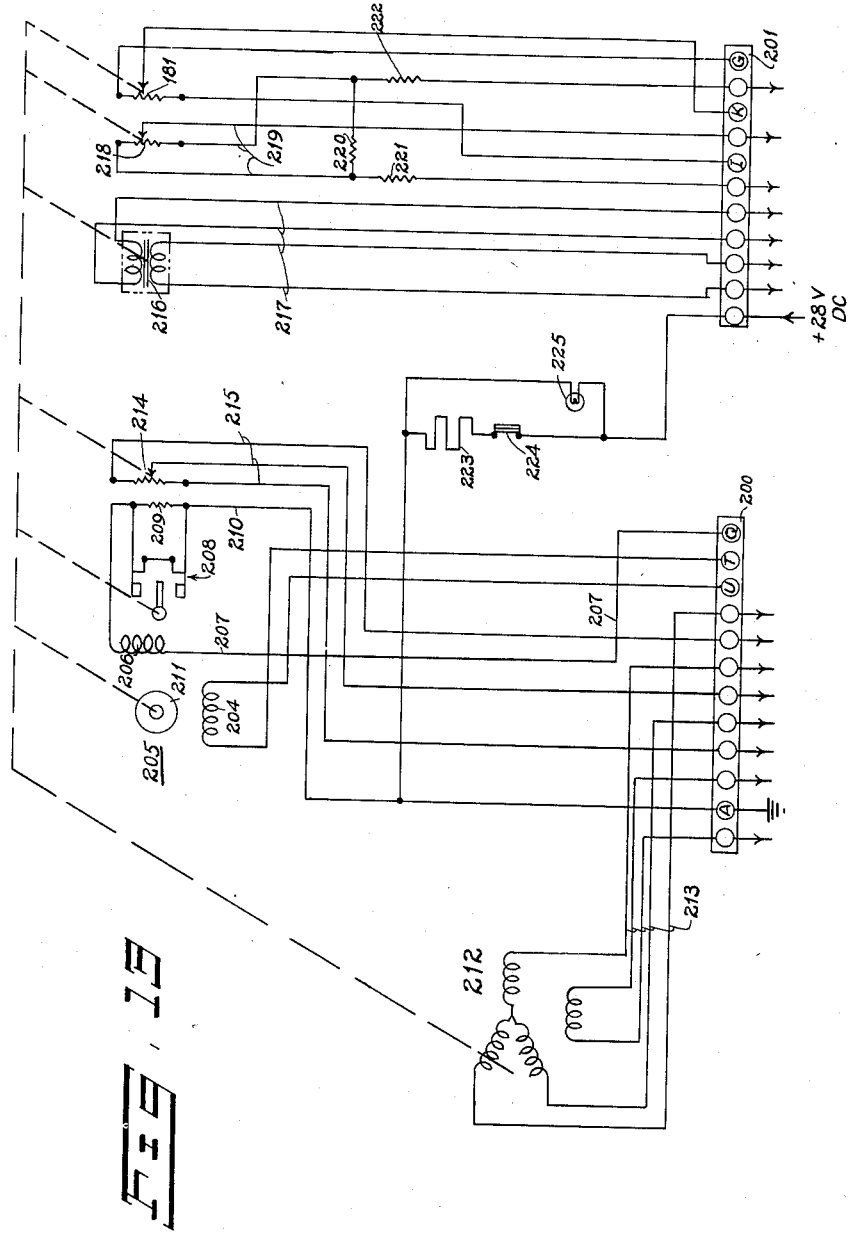

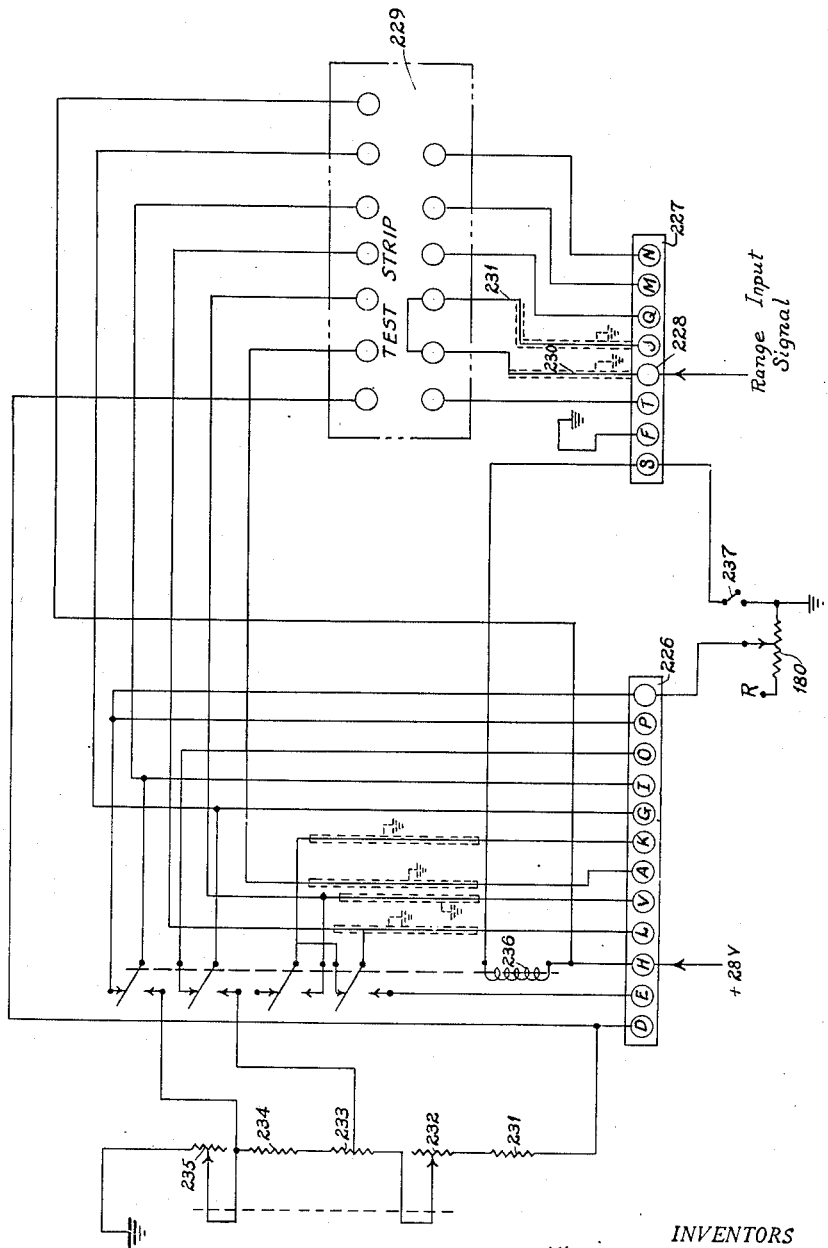

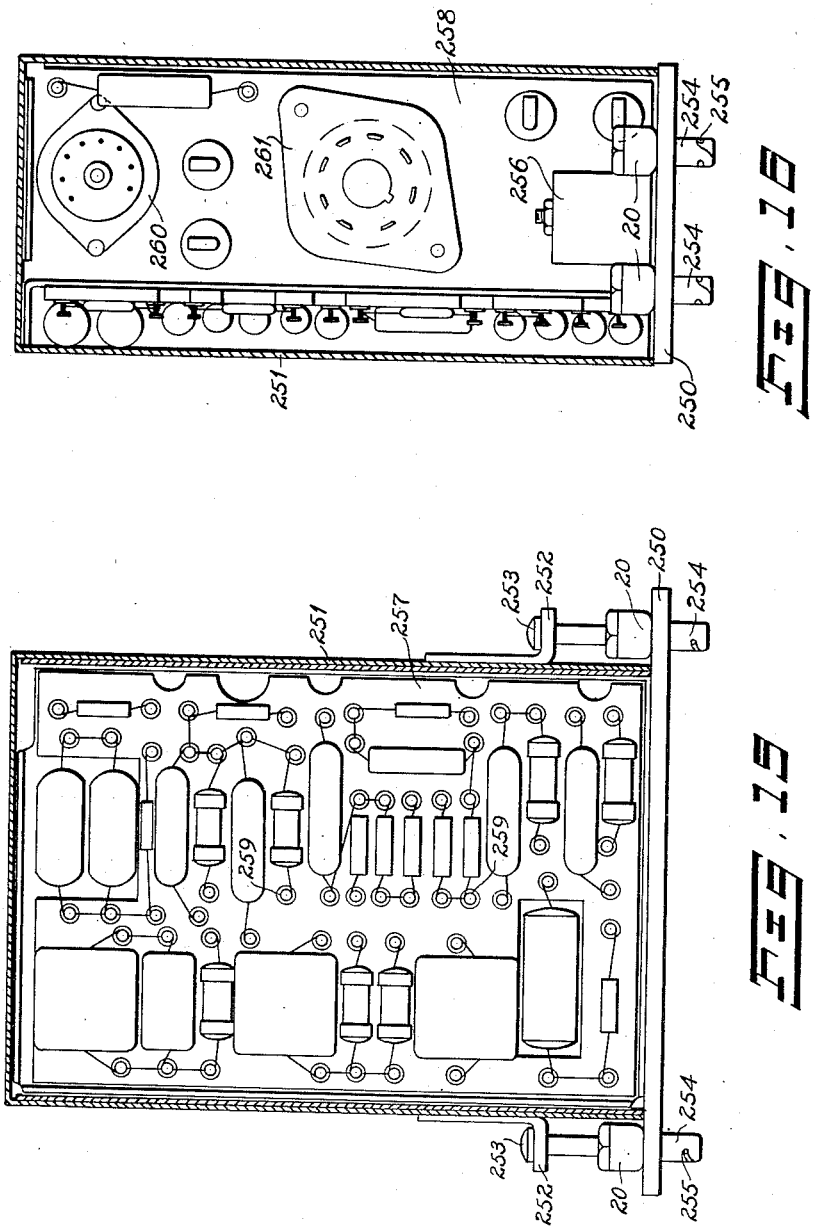

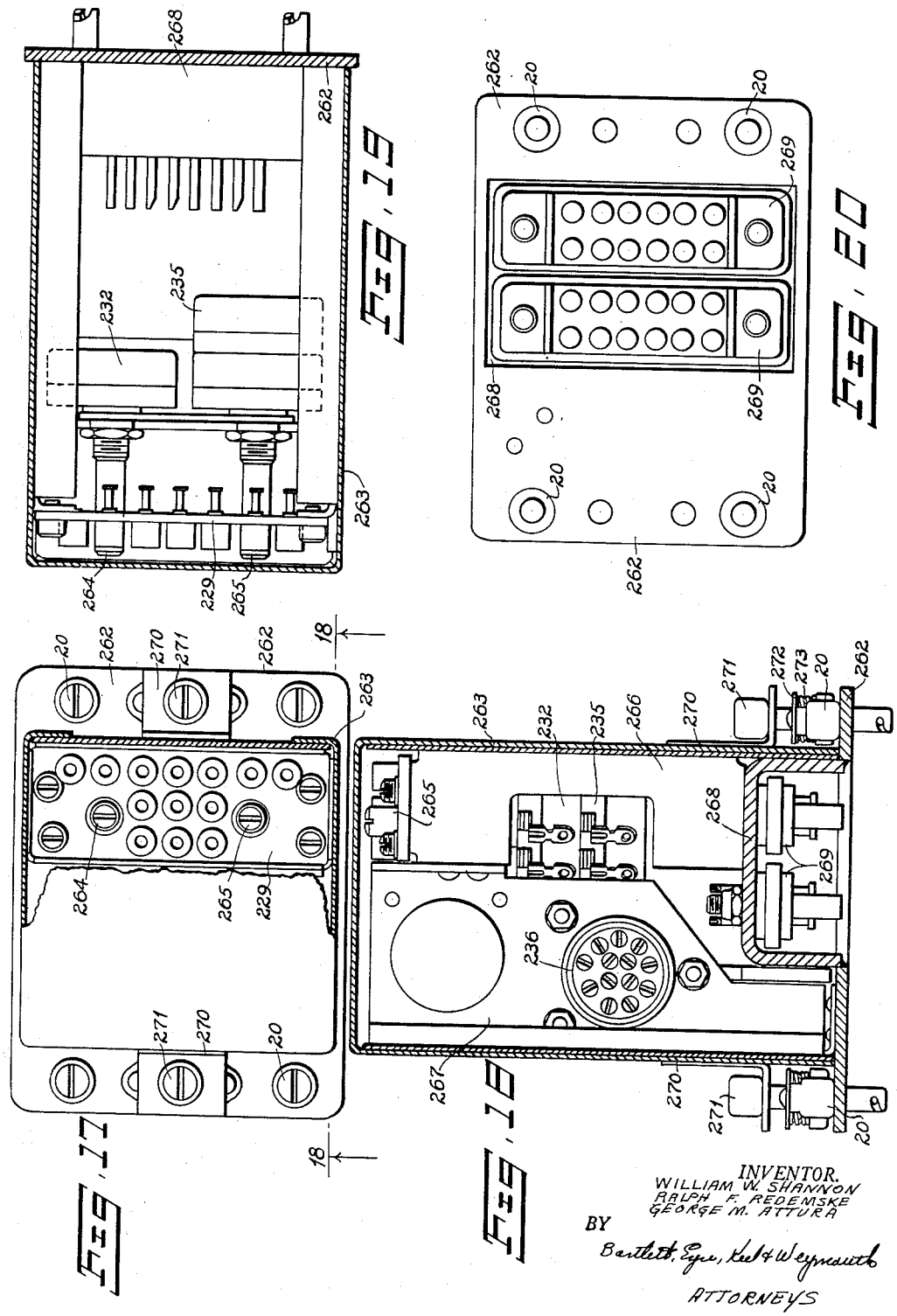

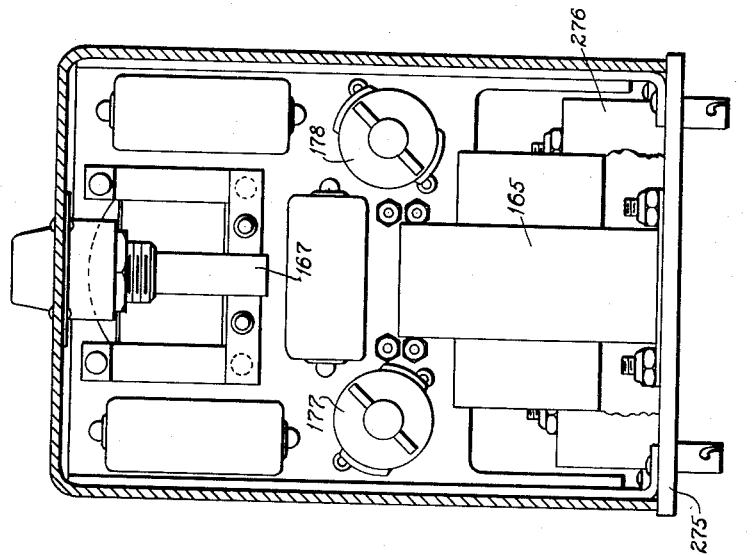
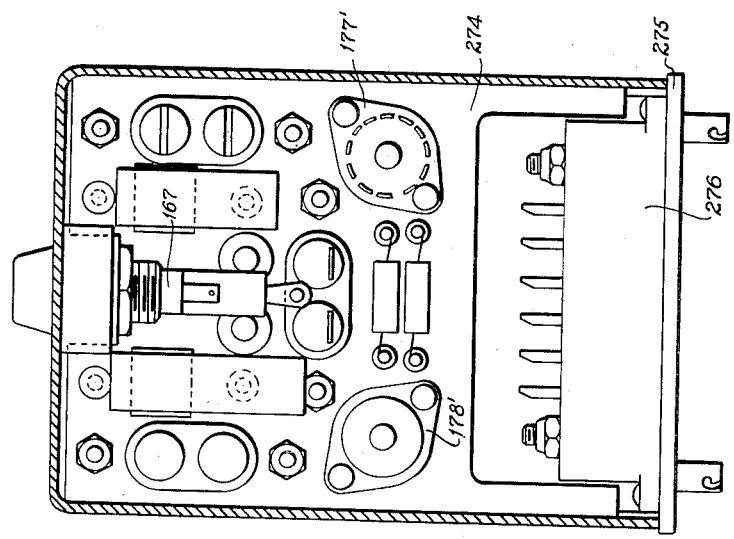

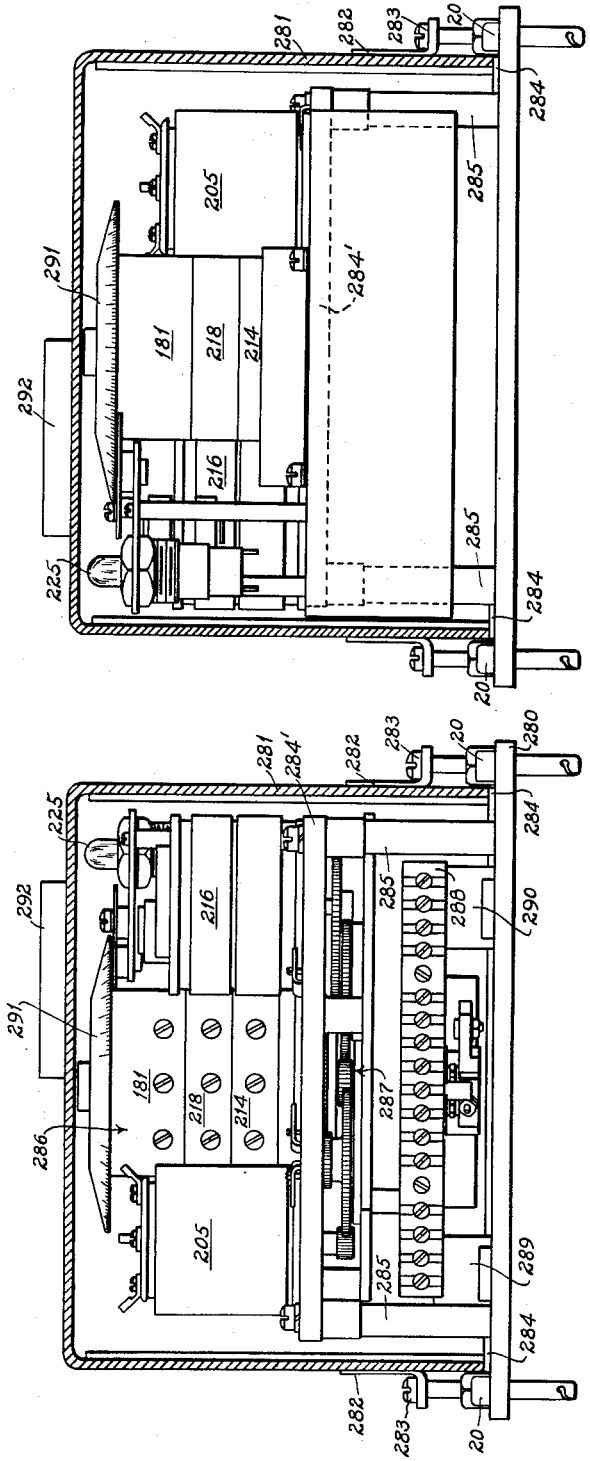

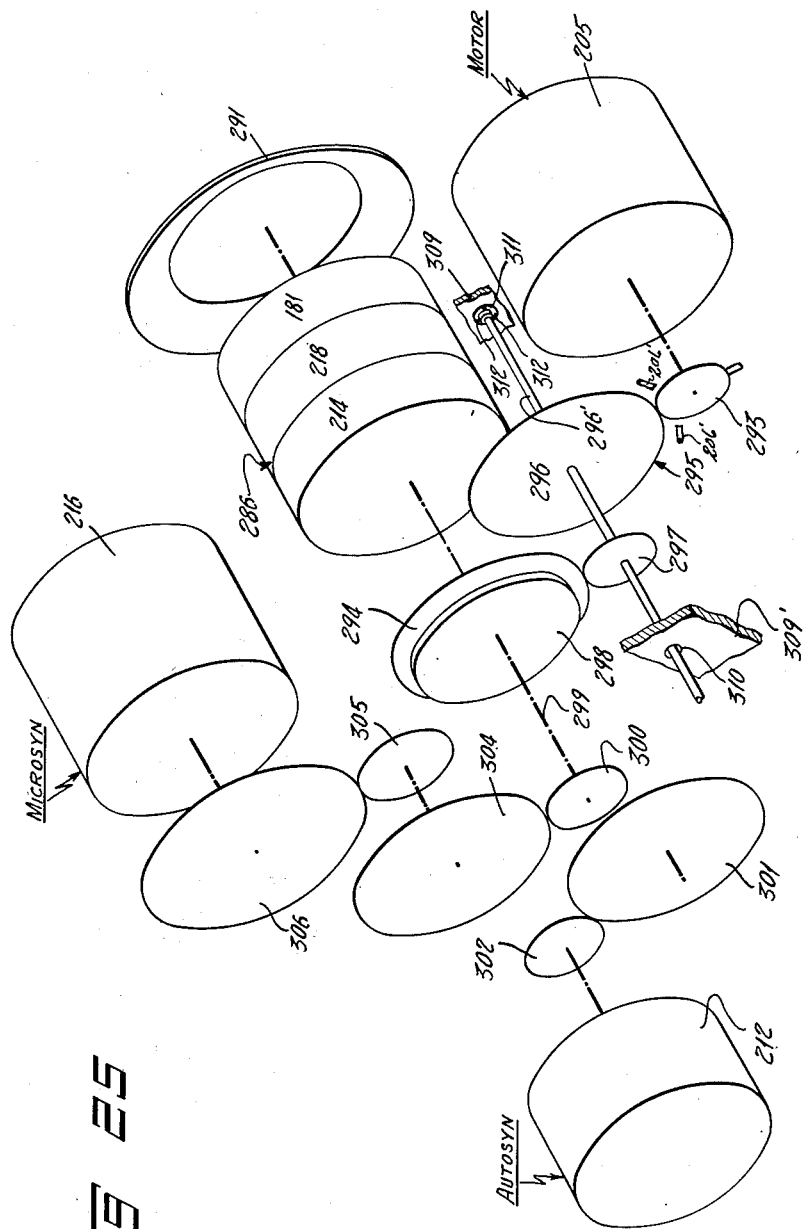

2,689,319

UNITED STATES PATENT OFFICE 2,689,319

SERVO CONTROL APPARATUS AND METHOD

William W. Shannon, Glenwood Landing, Ralph F. Redemske, Huntington Bay Hills, and George M. Attura, Levittown, N. Y., assignors to Servomechanisms, Inc., Mineola, N. Y., a corporation of New York Application March 4, 1950, Serial No. 147,612

9 Claims. (Cl. 318—28)

This invention relates to electrical control apparatus and in certain of its aspects it concerns more particularly servo and follow-up systems.

One object of the invention is to provide an electrical servomechanism chaarcterized by high dynamic performance and smooth hunt-free operation.

Another object of the invention is to provide a new and improved servo system that is compact, highly stable in operation, and readily serviceable with minimum interruption of normal service.

Another object of the invention is a new and improved method and means for constructing electrical control apparatus to enable rapid interchange of components thereof.

Another object of the invention is a new and improved method and system for quickly and easily modifying the electrical characteristics of electronic systems and particularly servo systems to co-ordinate the system with the electrical apparatus with which it is to function.

Another object of the invention is a new and improved modulator particularly useful for servo systems.

Another object of the invention is a new and improved servo apparatus for co-ordinating a gun sight with radar target-locating and/or ranging equipment.

Still another object of the invention is a new and improved electro-mechanical servo system.

Still another object of the invention is a new and improved adapter means for co-ordinating servo apparatus with apparatus with which it is to function.

Another object of the invention is a new and improved means for servo apparatus to facilitate the transfer of information produced by the servo to the apparatus to be controlled thereby.

Still another object of the invention is a new and improved servo device.

The above and other objects of the invention will become more apparent in the following description when taken in connection with the accompanying drawings forming part of this application.

In the drawings:

Figs. 1, 2 and 3 are plan, side and end views of one embodiment of the invention;

Figs. 4, 5 and 6 are plan, side and end views of another embodiment of the invention;

Figs. 7, 8 and 9 are plan, side and end views of still another embodiment of the invention;

Figs. 10 to 14 inclusive are circuit diagrams of a control device in accordance with the invention.

Figs. 15 and 16 are front and side cutaway views of the modulator unit of Fig. 1 to show certain internal structural features;

Fig. 17 is a view of the adapter unit of Fig. 1 in fragmentary section;

Figs. 18 and 19 are cross sectional views of the adaptor unit taken along the lines 18—18 and 19—19, respectively of Fig. 17;

Fig. 20 is a bottom view of the adaptor unit of Fig. 17;

Figs. 21 and 22 are front and side cutaway views of the power supply unit of Fig. 1;

Figs. 23 and 24 are front and side cutaway views of the mechanism unit of Fig. 1; and Fig. 25 is a diagrammatic layout of the gear train embodied in the mechanism unit of Fig. 1.

The control apparatus according to the invention illustrated in the drawings is of the servo or follow-up type for causing an output load to follow rapidly and accurately variations in an input signal. It is more specifically an electromechanical device adapted to coordinate gun controlling devices with range measuring apparatus. Although this invention is particularly useful for servo-mechanisms of the type referred to above, it will become apparent as the description proceeds that the invention is useful for other types of electronic and control apparatus.

Servo devices may generally be considered as devices for co-ordinating the physical position of one device or load with the physical position of an input device or with measurements of a physical condition. The form of the invention shown in the drawings is arranged to receive information in the form of an electrical signal varied in accordance with changes in the range or distance between two given points and transform such signal into one or more electrical signals for transmission to a gun or gunsight for the movement of the gun to follow changes in range. In aircraft applications wherein the control signal is varied in terms of the range between two aircraft, the servo must respond accurately and almost instantaneously to changes in order to enable the gun sight computer to produce accurate answers. This is accomplished with the present invention and in addition a new and improved structure is provided which enables the fabrication of highly compact, efficient, high-powered and dependable equipment and equipment that is quickly and easily repaired with minimum interruption of service. The system according to the invention has high dynamic performance, smooth hunt-free operation, and the components are functionally arranged and connected to enable rapid replacement in event of failure.

Briefly, the embodiment of the invention herein described comprises a plurality of units combined on suitable mounting means to form a complete servo control. It includes a modulator unit, an amplifier, a power supply and output mechanism unit interconnected one with the other to form a complete servo unit. The embodiment also includes an adapter unit interconnected with the other units to modify the characteristics of the complete servo unit in accordance with the characteristics of the apparatus with which it is to operate. The function and structure of each of the above units or components of the complete servo including the adapter unit will be described in detail.

Figs. 1 to 3 illustrate one form of servo in accordance with the invention wherein the modulator 10, amplifier 11, power supply 12, mechanism 13 and adapter 14 are all mounted on a single chassis 15. The chassis is formed of three substantially parallel plates 16, 17 and 18. The plate 16 carries the several units comprising the servo together with plug-in connections 18' and 19. Cooperating connectors are provided on the bottom of each unit and on the chassis plate 16 and these connectors together with the plug-in connectors 18' and 19 are interconnected within the chassis by wire cables. The cabling beneath the plate 16 has been omitted from Figs. 1 to 3 in order to simplify the drawings but is shown in the figures illustrating the chassis and will be described in connection therewith.

The plate 16 of the chassis is carried by a bottom cover plate 17 to protect the cabling and terminals below plate 16 and the completed unit is then shock mounted on a bottom plate 18.

To facilitate replacement of one or more of the units 10 to 14 inclusive, the connectors for each are of the self-ejecting type and each unit is held in place on the chassis by four quick-release locks 20. The individual units are arranged and constructed so that the characteristics of similar units are identical and any one unit is readily interchangeable with any other similar unit without in any way affecting or modifying the characteristics of the complete servo device.

Figures 4 to 9 inclusive show another method of mounting the component units of the control device in accordance with the invention. These figures show among other things the facility with which the units may be arranged in different type mountings to meet space requirements. This is especially important in aircraft applications as the components of the servo can be mounted and arranged to utilize small spaces or compartments in an aircraft that may otherwise be lost. This facility of mounting and arranging the individual components is brought about by what may be termed "functional packaging" of the electrical components to form the component units 10 to 14 inclusive as well as the circuit arrangements which provide for complete interchangeability of the units. Moreover, the chassis does not contain any electrical components other than the wiring which further facilitates the mounting of the units in any desired manner.

In Figs. 4 to 6 inclusive the component units 10, 11, 12 and 14 are mounted on a separate chassis 21 substantially similar in structure to the chassis 15 of Fig. 2 except that only the two upper plates herein denoted by the numerals 22 and 23 are illustrated. The plate 23, however, is adapted to be shock-mounted on a base plate in the same manner as chassis 15 of Fig. 2. The remaining component of the servo, namely, the mechanism unit 13, is shown separately mounted in Figs. 7 to 9 with the chassis 24 being illustrated with only the upper plate 25 and the intermediate plate 26, the latter adapted to be shock-mounted on a suitable base plate. The electrical plug-in connectors 27 in Fig. 4, and 28 and 29 in Fig. 7, are used for interconnecting the mechanism unit 13 with the other component units in Fig. 4 and with the apparatus with which it is to function, such for example as a radar set and a gunsight or gun, so that the former through the servo can be used to control the gunsight for aiming the gun at a target located by the radar equipment.

The circuit diagrams for the several components 10 to 14 inclusive are shown in Figs. 10 to 14 respectively. In each of the circuit diagrams a terminal strip is illustrated with each terminal bearing letter designation to indicate the connections of that unit with each of the other units. For instance, the terminals marked "A" on one unit are to be connected together and to the terminals marked "A" on each of the other units. These connections are completed through the cabling in the chassis previously referred to so that when the units are plugged into their respective places on the chassis they are automatically connected to each of the other units.

Fig. 10 is a circuit diagram of the modulator unit. This unit is similar to the modulator shown and described in the United States patent application of George M. Attura, filed September 30, 1949, Serial No. 118,968, entitled Modulating Device and Method.

Briefly, the modulator unit receives an incoming or control signal from the controlling apparatus as, for example, a radar target locator, which signal may vary in polarity and amplitude proportional to range, and the rate of such variations changes with the rate of change of the distance of the target from the locator. This signal is treated by the modulator and upon further amplification, as will be hereinafter described, may be used to control the range or deflection of a gun or gunsight so that it is always directed at the target. It is of course apparent that the invention is not limited to target locating apparatus but can be used in any application wherein it is desired to cause one device to follow certain movements of another control device.

More particularly, the modulator includes a comparator 30 arranged to receive two direct current signals $E_1$ and $E_2$ at the network terminals 31 and 32 respectively, the input voltages being indicated as arrows on the wires leading to those terminals. $E_1$ is the control voltage referred to above, while $E_2$ is a stabilizing or bucking voltage that is modified by changes in the output produced by changes in $E_1$ and functions to improve the accuracy and stability of the servo mechanism. The manner of producing this feedback or stabilizing voltage will be discussed in detail in connection with the mechanism unit shown in Fig. 13 and the adapter unit in Fig. 14.

The comparator 30 consists of a plurality of resistors 33 to 37 inclusive and condensers 38 to 41 inclusive. The control signal $E_1$ enters the modulator through terminal J of the terminal strip 46 and is conducted to terminal 31 of the comparator 30 by a lead 42. This signal is then differentiated by the parallel arrangement of condenser 38 and resistor 33 and the changes in the signal integrated by the series connection of resistor 34 and condenser 39 from terminal 43 of the network to terminal 44, the latter being connected to the grounded terminal A of the terminal strip 46 through lead 45. The feedback signal $E_2$ entering through terminal V and lead 47 is treated in a similar manner by condenser 41 and resistor 36 and the series connection of resistor 35 and condenser 40, the latter being connected between terminal 48 of the network to the ground terminal 44. By proper control of the values of the components of the comparator 30, means for adjusting it, as for example variable condensers or resistors, is rendered wholly unnecessary and provides a stable dependable electrical network easily duplicated in quantity production of the device. A resistor 37 is bridged between terminals 31 and 32 to complete the comparator 30.

The output signal of the comparator appears across terminals 43 and 48 and is fed to a resistor 49 connected in series with vibrating contacts 50 and 51 of vibrator 52. The coil 53 of the vibrator 52 is connected through leads 54 to terminals B and C to which an alternating current is applied to energize the coil and cause the contacts 50 and 51 to alternately open and close. This action interrupts the output signal appearing across terminals 43 and 48 which is a signal resulting from the combination $E_1$ and $E_2$ and may be termed an error signal. The alternating or interrupted error signal is then applied through a condenser 55 to the grid 56 of the cathode-follower tube 57. The cathode 58 of tube 57 is connected to ground through resistors 59 and 60 and lead 45 to terminal A while the grid 56 is returned to ground through resistor 61 to the junction 62 of resistors 59 and 60.

The output of tube 57 is taken from junction 62 in its cathode circuit and fed through a coupling condenser 63 and resistor 64 to the grid 65 of tube 66. In the particular embodiment resistor 64 together with resistor 67 form the grid return circuit and also a voltage limiter to prevent excessive input signal to the grid 65. The cathode 77 of tube 66 is connected to the ground bus-bar 45 through resistor 68 and is adapted to be by-passed under certain conditions by condenser 76 connected from the cathode 77 to terminal F. This terminal upon assembly of the components to form a complete unit is connected to terminal F of the adapter unit (Fig. 14), which in turn is connected to ground to increase the gain of tube 66. With another form of adapter unit, however, the terminal F may be left open, thereby decreasing the gain of tube 66.

Plate voltage is supplied to tubes 57 and 66 through terminal D of the modulator unit, the former through resistor 70 to the plate 69 and the latter through resistor 72 to the plate 71. The output of the modulator is then fed from junction 73 through condenser 74, junction 75 and lead 78 to the output terminal E.

The output of the modulator appearing at terminal E would approximate a square wave form assuming it constituted only those elements heretofore described. In the present embodiment of the invention, however, a sine wave voltage is preferred and to modify the square wave form accordingly a double wein bridge formed of resistors 79 to 81 and condensers 82 to 84 is connected in a feed-back arrangement between the plate circuit junction 75 and grid 65 of tube 66. The center junction 85 of the bridge is connected to ground through the ground bus-bar 45.

To simplify the circuit, the filaments for tubes 57 and 66 are illustrated at 86 and 87 just above the terminal board 46 and are connected in series with each other and with a resistor 88 across the terminals H and A to which are supplied in the present embodiment 28 volts D. C.

The output signal of the modulator presented at terminal E thereof is connected through the adapter unit (Fig. 14) to terminal L of the amplifier terminal strip 90 shown in Fig. 11 and is applied to the grid 91 of the first amplifier tube 92 by means of lead 93, the double wein bridge 94 consisting of resistors 95 to 97 and condensers 98 to 101, and coupling condenser 102. The center terminal 103 of the bridge 94 is connected to ground through lead 104 to one of the ground terminals A. The bridge 94 is used to introduce a signal component proportional to the rate of change of error in addition to the normal incoming error signal. The relative magnitude of the error rate and error signals is controlled by unbalancing the component values of the network from the normally correct values for a perfectly balanced network. A condenser 105 is bridged between the output terminal of the wein bridge 94 and ground to attenuate the high frequencies.

The cathode 106 of tube 92 is directly connected to the suppressor grid 107 by a jumper wire 108 and is provided with a fixed positive bias by the voltage divider comprising resistors 109 and 110, the former being connected between the cathode 106 and ground lead 104 and the latter between the jumper 108 and lead 111, which is in turn connected to the +200 volt terminal N. The lead 111 also supplies voltage to the screen grid 112 through resistor 113 and to the plate 114 through the plate lead resistor 115. The screen grid 112 is by-passed by condenser 116 connected between the screen grid and ground lead 117, the latter being connected to another ground terminal A on the terminal strip 90. The plate 114 of the tube is also by-passed to ground by condenser 118.

The signal from the plate 114 of tube 92 is applied to the grid 119 of tube 120 through the series connected coupling condenser 121 and resistor 122, the ground return for the grid being completed through resistor 122, junction 123, and resistor 124 to the ground wire 117. In certain instances it may be desirable to provide another input or an auxiliary input to the amplifier and by-pass the first tube 92 thereof. For this purpose an "Aux. Input" terminal 125 is provided on the terminal strip 90 and connected by lead 126 to the junction terminal 123. With two minor exceptions the remainder of the circuit for tube 120 is similar to that described in connection with tube 92 and, therefore, like components in each circuit are similarly numbered with those components associated with tube 120 being primed. The exceptions above noted consist in the omission of condenser 118 from the plate circuit of tube 120 and the return of resistor 110′ through lead 127 and 128 to the 250 volt terminal M in place of the 200 volt terminal N as in the case of resistor 110.

The third stage of the amplifier is the triode tube 129, the grid 130 of which is fed from the output side of condenser 121′ through a resistor 131. The resistor 131 together with resistor 132 forms a ground return for the grid 130 to the ground lead 117. The circuit for the cathode 133 includes only a resistor 134 to provide the bias for the tube and is connected to ground lead 117 through the lead 135. The plate or output circuit for the tube includes the plate 136, primary winding 138 of transformer 137 with a condenser 139 in parallel therewith and lead 128 to the 250 volt terminal M.

The last or final stage of the amplifier consists of a push-pull arrangement of tubes 140 and 141. The respective grids 143 and 144 of these tubes are connected to the outside terminals of the secondary winding 142 of transformer 137 while the center tap thereof is connected by lead 145 to a ground terminal A on the terminal strip. The plates 146 and 147 are similarly connected to the outside terminals of the primary winding 148 of output transformer 149 with its center tap being connected directly to the screen grids 150 and 151 and by means of leads 152 and 128 to the 250 volt terminal M. The output of the amplifier is taken from the secondary winding 153 of transformer 149 and connected through leads 155 and 154 to the output terminals U and T. Bridged across the output winding 153 is a condenser 156 and a gas-filled tube 157 in series with a resistor 159, the tube acting as an indicator to show the presence of a signal at the output of the amplifier. For convenience, the several tube filaments have been illustrated at 160 apart from the tubes and connected to the A. C. heater terminals C and B.

The feedback circuit is used to obtain a lower effective output impedance of the amplifier and this circuit includes part of the output winding 153 and the resistor 158 to feed a part of the output voltage to grid 130 of tube 129. This circuit is commonly termed an inverse feedback circuit.

The power supply for the servo mechanism device is housed in a separate unit and the circuit diagram is shown in Fig. 12. The circuit is of a conventional character designed to operate at about 400 cycles (common in aircraft) and employs full wave rectification with a choke input filter. As in the case with the modulator and amplifier (Figs. 10 and 11, respectively) this unit is also provided with a plug in terminal strip denoted by the numeral 160.

In the illustrated form of the invention the power (115 volts—400 cycles) is connected to terminals 161 and 163. Terminal 161 is connected to the primary winding 166 of the power transformer 165 through a fuse 167 and terminal 163 is connected by lead 164 directly to the other side of the primary winding. The terminal R is connected through the wire 168 and resistor 169 to the transformer side of fuse 167. This voltage is used in connection with a control potentiometer 180 in Fig. 14 to provide a manually variable bucking voltage the purpose and operation of which will be discussed in connection with the adaptor unit in Fig. 14.

The transformer 165 is provided with three separate secondary windings, namely the high voltage winding 170, a 6:3 volt winding 171 and a 26 volt winding 172. The winding 171 is connected directly to terminals B and C through leads 173 and 174 and provides filament energy for certain of the tubes, the vibrator or chopper 52 in Fig. 10, etc. Winding 172 is connected directly to the terminals O and P through connections 175 and 176 and, as will hereinafter be explained, is used in certain instances to provide the feedback or bucking voltage to the potentiometer indicated at 181 in Fig. 13.

The rectifier tubes 177 and 178 are each of the full wave type with the lefthand plates 179 and 182 connected to the lower side of the winding 170 and the right hand plates 183 and 184 are connected to the upper side thereof. The center tap or winding 170 is connected to ground. The full wave rectified voltage is obtained between cathode 185 and 186 and ground, the former being connected to the input of a filter including choke 189 in parallel with a condenser 190, bleeder resistor 191 and condensers 192. The output voltage (250 volts D. C.) is obtained at junction 195 and connected by the lead 196 to the terminal M. A lower voltage (about 200 volts D. C.) is obtained by means of the dropping resistor 193, this lower voltage appearing at junction 197 and connected to terminal N by the lead 198. This voltage is further filtered by the condenser 194 between junction 197 and ground. Lead 199 is a ground wire representing the connection of the grounds illustrated in the circuit to terminal A on the terminal strip 160. The terminal Q is connected by means of lead 202 to the transformer side of the fuse 167 and furnishes power for the drive motor to be explained in connection with Fig. 13.

Reference is now made to Fig. 13 which illustrates the electrical circuits and certain mechanical connections in the mechanism unit 13. It will be noted that only certain of the terminals on the terminal strips 200 and 201 are lettered. These lettered terminals indicate connections to other positions of the servo unit as previously described while the unlettered terminals generally connect to external apparatus to be controlled by the servo.

The terminals U and T on terminal strip 200 are connected directly to a winding 204 of the drive motor 205. The other winding 206 of the motor is connected on one side through lead 207 to the terminal Q and on the other side through a limit switch 208 in parallel with resistor 209 and the lead 210 to the ground terminal A on strip 200. The winding 206 is generally termed a fixed phase or reference winding and is energized by 115 volts from terminal Q which is obtained from the power supply in Fig. 12. The rotor 211 of the drive motor is mechanically coupled to a number of devices to be described and such coupling is indicated herein by the broken lines.

The potentiometers 214, 218 and 181 are designed to rotate through an angle somewhat less than 360° and it is therefore necessary to halt rotation of the motor at each end of its travel. For this purpose a limit switch 208 is arranged to reduce the current through the winding 206 just before it hits one or the other of the mechanical stops 206' provided in the drive gear train diagrammatically illustrated in Fig. 25. Thus strain on the gears of the system as well as overheating of the motor even in the event of the pressure of a full output voltage from the amplifier is effectively prevented.

As heretofore mentioned, the form of the invention illustrated is for the control of gun sights in accordance with range measurements performed by radar equipment and for this purpose a number of electric current controls are provided for the control of the gun sight. The particular manner of such control eliminates all mechanical connections and couplings and has been found to result in a more accurate and highly stable device.

The several control devices are mechanically coupled to the motor 205 which is responsive to the output of the amplifier. The first of these devices is an autosyn or selsyn motor 212 having a single phase wound rotor mechanically connected to motor 205 and a three phase stator. The five leads 213 are all connected to individual terminals on strip 200 for connection to the sight. The other devices controlled by the motor 205 are the potentiometer 214 connected to the terminal strip 200 by leads 215, the microsyn 216 connected to terminal strip 201 by leads 217 and potentiometer 218 connected to terminal strip 201 by leads 219. Three resistors 220, 221 and 222 are connected in circuit with the potentiometer 218 to effect in the particular embodiment a reduction in the effect of the potentiometer on the electric circuit of the gun sight to be controlled thereby. The potentiometer 181 is connected to terminals G, I and K. These terminals are in turn connected with similarly lettered terminals of adapter unit Fig. 14. When relay 236 is energized for operation in response to the range signal, the terminals I and G are connected within the adapter unit to resistors 235 and 233 which are part of the voltage divider that is grounded at one end and has a D. C. voltage from the radar equipment or other external source applied to the other end by means of terminal D. This voltage is termed the reference voltage. The movable contactor of potentiometer 181 connected with terminal K is interconnected with terminal V in the adapter unit which is in turn connected with terminal V of the modulator (Fig. 10) and supplies voltage $E_2$ to the comparator network. Therefore, as the voltage $E_1$ changes, the unbalance produced between $E_1$ and $E_2$ will cause the drive motor 205 to rotate and in turn rotate potentiometer 181 until voltage $E_2$ equals $E_1$ to completely cancel the new value of $E_1$ and stop the drive motor 205.

The mechanism unit 13, the circuit of which has just been described, is provided with a thermostatically controlled heater to keep the mechanical parts within predetermined temperature limits and thus improve the operation of the device. The heater is denoted by the numeral 223 in Fig. 13, the thermostatic switch by numeral 224 and a signal light by the numeral 225. The switch and heater are connected between terminal A of strip 200 and the +28 volt D. C. terminal on strip 201. A pilot light 225 is connected directly across the heater and switch to show that power is present to maintain the temperature of the unit and to illuminate the range dial 291 (Fig. 23).

The adapter unit 14, as previously described is arranged to coordinate the operation of the other component units and to modify their operation to meet the requirements of particular devices with which the entire servo mechanism unit is to function, as for instance, the radar set. The adapter unit 14 also provides convenient means for bringing together certain circuits for testing purposes so that the operation of each unit and of the servo as a whole can be readily and easily determined. These important features will become evident as the description proceeds.

The adapter unit has two terminal strips or connectors 226 and 227 similar to the terminal strips described in connection with the other units. The range input signal from the radar equipment enters the entire servomechanism unit through terminal 228 on strip 227 and is connected to a test strip 229 by a shielded lead 230 and thence back to terminal J by a shielded lead 231. By bringing the radar signal to the readily accessible test strip the presence of an input signal from the radar set can be quickly detected at the servo unit. The other voltages brought to the test terminal strip 229 are as follows:

| Terminal | Type of Signal | Unit |
|---|---|---|
| D | Reference voltage | Applied to Adapter Fig. 14 and to Modulator Fig. 10. |
| A | Ground | All units. |
| V | Feedback signal | Applied to Modulator Fig. 10. |
| L | Control signal | Input to Amplifier Fig. 11. |
| I | Bucking voltage | Mechanism Fig. 13 (one end of Pot. 181). |
| G | Bucking voltage | Mechanism Fig. 13 (Pot. 181). |
| H | +28 Volts D. C. | For all units. |
| T | Output | Amplifier Fig. 11. |
| Q | 115 v. A. C. | Applied to Power Supply Fig. 12. |
| M | +250 v. D. C. | Output of Power Supply Fig. 12. |
| N | +200 v. D. C. | Do. |

The terminal D on strip 226 is connected through resistors 231 to 235, inclusive, to ground, resistors 232 and 235 being rheostats. For the bucking voltage of the servomechanism unit a D. C. voltage is provided from the radar or other external source and it is called a reference voltage. The magnitude of this voltage fixes certain characteristics of the servo unit and is applied to terminal D of the adapter unit and the modulator unit (Fig. 10).

A relay is also provided in this adapter unit to enable the servo to be operated manually in the event of failure of the radar control. The relay is operated by a magnetic coil 236 connected between terminals H and S, the latter connected through switch 237 to ground. The plurality of relay contacts controlled by the coil, arrange the various circuits for either automatic operation or manual operation. When the relay is in the deenergized position the terminals I and G from the potentiometer 181 of Fig. 13 are connected to terminals O and P to which is applied 26 v. A. C. (see Fig. 12). The input of the amplifier is disconnected from the modulator and the adjustable terminal K of the bucking potentiometer is connected to the input of the amplifier.

With the relay 236 actuated the output of the modulator appearing at terminal E is connected with the input of the amplifier (terminal L) and the terminals G and I are connected to resistors 233 and 235 to apply a D. C. voltage to the bucking potentiometer 181. The movable arm of the bucking potentiometer connected to terminal K is bridged by the relay to terminal V for transmission of the bucking or feedback signal to the modulator 10 (Fig. 10). It will also be noted that terminal F of the adapter is grounded, and reference to the modulator circuit, Fig. 10, will show that the condenser 76 in the cathode of tube 66 is connected to ground to increase the voltage gain of tube 66 in this particular adapter unit.

Potentiometer 180 (Fig. 14) is manually operated and constitutes the manually controlled device for operating the gun sight in the event of failure of the radar equipment. Terminal R of this control is connected to the high side of 115 volt 400 cycle power through a series resistor 169 (Fig. 12) while the other side is connected to ground. The adjustable center tap is connected within the adapter (Fig. 14) to terminal P and biases the 26 v. 400 cycle winding 172 (Fig. 12) that furnishes an alternating voltage to the bucking potentiometer 181 when the relay is in the position for manual operation. Thus the alternating current voltages from potentiometers 180 and 181 are in effect in series and oppose one another. The resultant voltage is fed to the input to the amplifier through terminal L and is zero when the two voltages are equal. The pilot by means of control 180 may therefore operate the gun sight manually should the radar equipment fail.

Figures 15 to 24 illustrate certain structural details of the several components 10 to 14 which in combination form the complete servomechanism. These figures are in general self-explanatory and the electric wiring has been purposely omitted in the interest of clarity.

The modulator 10 is illustrated in Figs. 15 and 16 and is provided with a base plate 250 supporting the component parts of the modulator and a housing 251 completely enclosing the unit and secured to the base in any suitable manner as by the angle brackets 252 and bolts 253 passing through the brackets and threaded into the base 250. The modulator is secured to the chassis, as for instance the chassis 15 in Fig. 1, by four quick-release catches 20, the shank 254 of which extends through the base and has a helical groove 255 terminating in a reversely curved part to receive and hold a transverse pin in the cooperating portion mounted on the chassis. This pin is spring loaded within the cooperating part of the catch positioned on the base 250 and is constantly urged downwardly. This action securely holds the modulator on the chassis with the electrical connectors in firm contact.

The electrical connectors are of the self-ejecting type with the plug or male portion recessed in the base plate 250. In this particular unit (Fig. 16) the recessed housing holding the plug connector is denoted by the numeral 256. The combination of the self-ejecting connector with the quick release catches previously described provides a firm and positive mount for the unit on the chassis and positive electrical connections for the modulator with the chassis circuits, and at the same time permits the unit to be quickly removed simply by about a quarter turn of each catch 20 by means of a screw driver and a new unit quickly and easily fastened in place without any possible danger of bending or damaging the connectors or encountering such tedious and trying problems as replacing conventional bolts and nuts.

All of the units 11 to 14 inclusive are fastened to the chassis in the same manner as the modulator unit 10 just described and this phase of each unit will not be described in detail.

The internal structure of the modulator 10 for supporting the electrical parts consists of a vertically disposed plate having sides 257 and 258 disposed at a right angle and fastened to the base 250. The plate 257 is spaced from the wall of the housing, is of insulating material, and has a plurality of terminals 259 to which the various components are connected and soldered (Fig. 15). The plate 258 supports socket 260 for the tubes 57 and 66 which are within a single envelope and the socket 261 for the vibrator or chopper 52 (Fig. 10).

Figs. 17, 18 and 19 are cut away views of the adapter unit showing the internal structure and Fig. 20 is a bottom view thereof. In Fig. 17 the top of the outer casing 263 is cut away to show the test strip 229 that was described in connection with Fig. 14. Also on this strip are the screw driver adjustments 264 and 265 for the variable resistors 232 and 235 shown in Fig. 19. The test strip is supported on the base 262 by a pair of vertical walls 266 while a third vertical wall 267 supports the relay 236 in a horizontal position (Fig. 18—only a bottom view showing the relay terminals being visible). The base plate 262 is recessed at 268 to house the connector plugs 269.

The cover or case 263 is held on to the base 262 by angle brackets 270 (Fig. 18) and quick release fasteners or catches 271 similar to the catches 20 previously described. The cooperating part of the catch 271 is shown at 272 and is mounted in the base 262. The spring loading the pin is visible at 273 with the catch part 271 and holds the cover 263 securely in place on the base. In this way the cover can be made dustproof and yet be readily removable for testing the entire servomechanism to determine which unit or units are at fault in the event of failure.

Two cutaway views of the power supply 12 are shown in Figs. 21 and 22, Fig. 21 being a so-called bottom view of the plate or chassis 274 and Fig. 22 being a so-called top view. In this unit as in the other units the plug part of the connector is recessed in the bottom plate, here denoted by 275, by a housing 276 fastened to the base plate. The structure of the power supply is clear from these figures although for further clarification certain of the components have been numbered in accordance with the numerals used to designate the same elements in Fig. 12. The sockets for tubes 177 and 178 are also indicated in Fig. 21 by the numerals 177' and 178'.

The structural details of the amplifier 11 are not shown in any of the figures. However, the electrical connectors and mechanical fasteners are the same as described in connection with the modulator 10 to enable rapid replacement of the unit in the event of failure.

The mechanical details of the mechanism unit 13 are shown in Figs. 23 and 24 while Fig. 25 illustrates diagrammatically the mechanical gear train for coupling the several units in the mechanism to the drive motor 205.

The basic structure of the mechanism unit 13 is similar to the other units heretofore described and is provided with a base 280 having four quick release catches 20 for holding the unit on the chassis 15 (Fig. 1). The cover 281 is secured to the base 280 by angle brackets 282 and screws 283, a seal 284 being interposed between the cover and the base to provide a dust tight seal.

In describing the internal structure of the mechanism 13 similar numerals will be used to designate like components appearing in such other figures as Figs. 13 and 25.

The component parts of the mechanism 13 are supported by a primary frame member 284' secured to and spaced from the base 280 by four tubular spacers 285. On top of the frame member 284' are fastened the drive motor 205, the potentiometer stack 286 consisting of the individual potentiometers 181, 214 and 218 and the microselsyn 216. The autosyn or selsyn 212 may be mounted on the frame 284' though it is not visible in either Figs. 23 or 24. Its mechanical relationship to the other units will however become more apparent in Fig. 25. Just beneath the frame member 284' is disposed the gear train 287 coupling the several units to the motor 205 and beneath the gear train is a terminal strip 288 for use in interconnecting the parts and the connector plugs mounted in the recessed base parts 289 and 290. The actual wiring has been omitted for clarity.

On top of the potentiometer is a range dial 291 that may be observed through a window 292 in the top of the cover 281. The range dial is directly calibrated for coordination with the radar equipment so that the range measured by such equipment can be determined simply by reading the dial (see also Fig. 1). Illumination is provided for the dial by pilot light 225.

Fig. 25 illustrates the gear train which is arranged to provide positive coupling between the units with but negligible back-lash thus greatly improving the accuracy and life of the equipment. One important feature of the gear train is the use of idler gears between each unit that are individually adjusted for optimum engagement with the cooperating gears. This is accomplished by means of adjustable pivots arranged for individual adjustment and when so adjusted may be permanently fixed in place.

The gear train is diagrammatically illustrated in Fig. 25 and the new and improved mounting and method of adjustment has been shown in connection with only one of the idler gears although it is to be understood that all of the idler gears are similarly mounted and adjusted. Motor 205 is the driving means for the gear train as previously pointed out and carries a motor gear 293 secured to its shaft which in turn is coupled to the driven clutch plate gear 294 through the idler cluster gear 295 having spur gears 296 and 297 mounted on a single shaft 296'. The clutch gear 294 and motor gear 293 are mounted so that the gears 296 and 297 can be properly meshed therewith by movement of the idler gears in a mean direction relative to the motor and clutch gears.

The driven plate 298 of the clutch is secured to a shaft 299 that directly drives the potentiometer 286 and a spur gear 300. Spur gear 300 drives the autosyn or selsyn 212 through the idler gear 301 and gear 302. Gear 300 also drives the idler cluster gear comprising spur gears 304 and 305, the latter meshing with the gear 306 affixed to the shaft of the microsyn or selsyn motor 216.

The gears 300 and 306 are positioned in a manner similar to the gears 293 and 294 so that by movement of the two idler gears 304 and 305 as a unit they can be brought into mesh with their respective gears.

The several idler gears are mounted on shafts that are provided with bearings at each end in order to effect a positive and sturdy mount and yet provide means whereby the idler gears can be accurately and precisely meshed with their cooperating gears. This mounting has been shown in connection with idler gears 296 and 297. On each end of the idler gear shaft 296' is illustrated a fragmentary section of the frame for holding the shaft. These sections are denoted by the numerals 309' and 309 and each has an opening (310 in section 309') through which the shaft may extend. The hole is somewhat larger than the shaft and allows sufficient play to effect the desired adjustment of the gears after assembly of the gear train.

The two bearings (of which only one is visible on the frame section 309) are placed in position during assembly and are provided with at least two openings 312 through which screws may be inserted and threaded into the frame. The openings 312 are also slightly larger than the screws to permit the desired amount of adjustment. After the complete assembly of the gear train, each idler gear is then adjusted to mesh accurately with their cooperating gears and the screws in openings 312 are tightened. To fix the adjustment one or more holes are drilled through the bearing flange and frame and taper pins are inserted to permanently set the position of the gears. With this arrangement practically all backlash and binding can be eliminated and thereby greatly improve the efficiency and accuracy of the entire unit.

This feature coupled with the thermostatically controlled heater to keep the lubricants at a uniform viscosity provides highly accurate transmission of rotation from the drive motor 205 to the other devices to be driven thereby.

As previously pointed out, the chassis 15 in Figs. 1 to 3 and the chassis 21 and 24 in Figs. 4 to 9 contain no electrical components other than the female connector receptacles and wire cabling for interconnecting the units 10 to 14 inclusive. Certain of the female connectors or receptacles are denoted by the numeral 308 in Figs. 1 to 3 inclusive. As the chassis contains no electrical parts such as resistors, condensers, tubes, etc. it is a substantially trouble free component and would be very infrequently if ever replaced. The units 10 to 14 are separate and distinct components containing the operating parts and upon failure the unit is replaced as a whole simply by releasing several quick release fasteners, removing the unit and replacing it with another identical unit. All units can be readily tested by removing the cover of the adapter unit 14 to expose the test panel 229, and the operation of the amplifier 11 can be determined by the neon light in the output circuit thereof and described in connection with Fig. 11.

Although only two different types of chassis for holding the components have been shown in Figs. 1 to 9, it is apparent that with the new and improved structural arrangement and design of the units 10 to 14 inclusive, other types of chassis may be used to meet particular space requirements.

We claim:

1. A servo comprising a modulator unit, an amplifier unit, an electromechanical transducing unit, an adapter unit, a power supply unit, a support chassis for said units, cooperating parts of plug-in connectors mounted on said chassis and on said units to permit ready removal of a unit from the chassis, and electrical connections in said chassis interconnecting the parts of the plug-in connectors mounted thereon, said adapter unit including means for impressing an input signal upon the modulator unit, means to control the magnitude of the response of the servo to a change in such input signal and means to control the connections between the modulator and amplifier units, said means in said adapter unit operating through said chassis connections when the units are plugged into the chassis.

2. A servo comprising a modulator unit, an amplifier unit, an electromechanical transducing unit, an adapter unit, a power supply unit, a support chassis for said units, cooperating parts of plug-in connectors mounted on said chassis and on said units to permit ready removal of a unit from the chassis, and electrical connections in said chassis interconnecting the parts of the plug-in connectors mounted thereon, said transducing unit being connected through said chassis connections to said amplifier unit for reception of controlling energy therefrom and including means responsive to such controlling energy for mechanically varying a plurality of electrical output signals and said adapter unit including means for impressing an input signal and one of said output signals upon said modulator unit for comparison therewith, said adapter unit also including means for connecting the output of said modulator unit to said amplifier unit, means for controlling the magnitude of response of the servo to a change in such input signal and means to control the connections between the modulator and amplifier units.

3. The servo according to claim 2 including means in said adapter unit for optionally disconnecting the modulator unit from the amplifier unit and impressing a controllable signal on the amplifier unit.

4. A servo comprising a modulator unit, an amplifier unit, an electromechanical transducing unit, an adapter unit, a power supply unit, a support chassis for said units, cooperating parts of plug-in connectors mounted on said chassis and on said units to permit ready removal of a unit from the chassis, electrical connections in said chassis interconnecting the parts of the plug-in connectors mounted thereon, said adapter including a test panel connected through said plug-in connections to each of said units, and means in said adapter unit for impressing an input signal upon the modulator unit, for controlling the magnitude of the response of the servo to a change in such input signal and for controlling the connections between the modulator and amplifier units.

5. A range servo, comprising a plurality of electronic units including a modulator for comparing a direct current input signal with a feedback signal to produce an alternating current error signal, an amplifier unit for amplifying the error signal, an electromechanical unit responsive to the output of the amplifier unit and adapted upon operation to produce mechanical motion, said electromechanical unit including means for transforming the mechanical motion to electrical signals including an electrical feedback signal for application to said modulator unit, and an adapter unit interconnected with said other units, said adapter unit including means for controlling the degree of mechanical motion of said electromechanical unit corresponding to a given change in the input signal and relay controlled contacts for disconnecting said modulator unit from said amplifier unit for converting the feedback signal to an alternating current signal and for impressing the converted feedback signal upon the amplifier unit for operator control of said electromechanical unit.

6. A servo for controlling airplane equipment, optionally responsive to a range input signal or to operator control, comprising in combination, modulator, amplifier, electro-mechanical and adapter units, said adapter unit including a relay and a plurality of contacts controlled thereby, said modulator unit incorporating means for comparing a range input signal with a direct current feedback signal to create an alternating current error signal, the output of said modulator unit being connectible to the input of said amplifier unit through said relay controlled contacts of the adapter unit, a potential divider in said adapter unit energized from a direct current reference voltage on the airplane, a source of alternating current voltage, said electro-mechanical unit including a servo motor connected to the output of the amplifier unit and electrical devices for control of airplane equipment controlled by said motor, a potentiometer in said electro-mechanical unit having a wiper positioned by said motor to yield a feedback signal, said relay in the adapter unit when energized connecting said potentiometer in said electro-mechanical unit across said potential divider, the wiper to the input of the modulator unit and the output of the modulator unit to the input of the amplifier unit and when de-energized connecting said potentiometer across a controllable part of said alternating current source and the wiper to the input of the amplifier unit and operator controlled means for energizing said relay.

7. The servo according to claim 6 including in said adapter unit a test panel, and input and output terminals for the range signal interconnected through said panel, said output terminal being connected to said modulator unit for delivery of the range input signal thereto.

8. The servo according to claim 7 wherein said adapter unit is a separately packaged plug-in unit and the potential divider is correlated to characteristics of airplane equipment to be controlled by the devices of the electro-mechanical unit.

9. The servo according to claim 6 wherein each of said units are separately packaged and provided with plug-in type terminals to permit individual replacement of any unit and to permit substitution of a different adapter unit to correlate the servo to different airplane equipment.

References Cited in the file of this patent

UNITED STATES PATENTS

| Number | Name | Date |
|---|---|---|
| 1,086,722 | Langston | Feb. 10, 1914 |
| 1,860,041 | Louchet | May 24, 1932 |
| 2,041,589 | Bowers | May 19, 1936 |
| 2,117,759 | Douglas | May 17, 1938 |
| 2,168,984 | Grimes | Aug. 8, 1939 |
| 2,268,619 | Reid | Jan. 6, 1942 |
| 2,300,742 | Harrison et al. | Nov. 3, 1942 |
| 2,336,994 | MacKay | Dec. 19, 1943 |
| 2,466,370 | Burtt | Apr. 5, 1949 |
| 2,477,895 | Pollock | Aug. 2, 1949 |
| 2,484,367 | Wills et al. | Oct. 11, 1949 |
| 2,515,638 | Doucette | July 18, 1950 |
| 2,573,840 | Grass | Nov. 6, 1951 |
| 2,584,954 | Williams, Jr. | Feb. 5, 1952 |